(12) United States Patent
Shah (10) Patent No.: US 10,645,665 B2
(45) Date of Patent: May 5, 2020

(54) PROFILE MANAGEMENT FOR PROVISIONING ACCESS TO AN ALTERNATIVE SERVICE PROVIDER

(71) Applicant: T-Mobile USA, Inc., Bellevue, WA (US)

(72) Inventor: Mehul Shah, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/672,138

(22) Filed: Aug. 8, 2017

(65) Prior Publication Data
US 2019/0053185 A1 Feb. 14, 2019

(51) Int. Cl.
*H04W 60/00* (2009.01)
*H04W 8/12* (2009.01)
*H04W 8/18* (2009.01)
*H04L 29/12* (2006.01)
*H04L 29/08* (2006.01)
*H04M 3/42* (2006.01)
*H04W 60/04* (2009.01)

(52) U.S. Cl.
CPC .......... *H04W 60/005* (2013.01); *H04W 8/12* (2013.01); *H04W 8/18* (2013.01); *H04L 61/1588* (2013.01); *H04L 67/306* (2013.01); *H04M 3/42144* (2013.01); *H04W 8/183* (2013.01); *H04W 60/04* (2013.01)

(58) Field of Classification Search
CPC ....... H04W 48/18; H04W 4/50; H04W 60/04; H04W 60/005; H04W 48/04; H04W 8/12; H04W 8/18; H04L 63/0853; H04L 61/1588; H04L 67/306; H04M 15/49; H04M 15/8033; H04M 17/103; H04M 3/42144
See application file for complete search history.

(56) References Cited

U.S. PATENT DOCUMENTS

2013/0132854 A1* 5/2013 Raleigh ................. G06F 3/0482
715/738
2014/0031012 A1 1/2014 Park et al.
(Continued)

OTHER PUBLICATIONS

The PCT Search Report and Written Opinion dated Nov. 8, 2018 for PCT Application No. PCT/US2018/043490, 12 pages.

*Primary Examiner* — Margaret G Mastrodonato
(74) *Attorney, Agent, or Firm* — Lee & Hayes, P.C.

(57) ABSTRACT

Provisioning access to an alternative service provider to a device via e-subscriber identity module (SIM) profile management is described herein. A service provider can determine that a device associated with the service provider is located outside of a home coverage area of the service provider and is not transmitting data via data session(s) established in association with the service provider and send, to the device, a notification including an access mechanism for enabling access to service(s) offered by an alternative service provider. The device can receive the notification from the server(s), determine actuation of the access mechanism, and send, to the alternative service provider, a request for access to the service(s) offered by the alternative service provider. The device can receive an eSIM profile from the alternative service provider, which it can install on the device to enable the device to access the service(s) offered by the alternative service provider.

20 Claims, 6 Drawing Sheets

(56) References Cited

U.S. PATENT DOCUMENTS

| | | | |
|---|---|---|---|
| 2014/0075567 A1* | 3/2014 | Raleigh | H04W 12/10 |
| | | | 726/26 |
| 2014/0088731 A1* | 3/2014 | Von Hauck | H04W 12/06 |
| | | | 700/14 |
| 2014/0099916 A1* | 4/2014 | Mallikarjunan | H04W 8/20 |
| | | | 455/406 |
| 2015/0195772 A1 | 7/2015 | Huang et al. | |
| 2015/0358806 A1 | 12/2015 | Salqvist | |
| 2016/0134316 A1* | 5/2016 | Mohan | H04W 8/22 |
| | | | 455/558 |
| 2016/0246611 A1* | 8/2016 | Li | H04W 12/08 |
| 2017/0223535 A1 | 8/2017 | Schell et al. | |

* cited by examiner

PROFILE MANAGEMENT FOR PROVISIONING ACCESS TO AN ALTERNATIVE SERVICE PROVIDER

BACKGROUND

Mobile devices can be associated with subscriber identity module (SIM) cards which store personal information of respective account holders. A SIM card can be a portable memory chip or an integrated memory chip. A SIM card associated with a mobile device can store data associated with account information corresponding to an account holder associated with the mobile device, a phone number of the account holder, an address book of the account holder, text messages sent and received via the mobile device, and other data. Generally, when a consumer opens an account associated with a service provider, such as a telecommunication service provider, the service provider can activate a SIM card of a mobile device associated with the account. That is, each SIM card includes a unique number printed on the memory chip which requires activation by the service provider (e.g., via a website associated with the service provider, via a call to the service provider, via provisioning by the service provider, etc.). Following activation of an account by the service provider, the consumer, via the mobile device, can utilize various services offered by the service provider.

In some examples, for instance with an e-subscriber identity module (eSIM), a profile (e.g., an eSIM profile) including a unique number (i.e., associated with a service provider) and other data (e.g., account information, rate plan, restrictions, etc.) can be downloaded by a mobile device, and no further activation is required to activate an account associated with the service provider and/or otherwise use services available from the service provider. For instance, a local profile assistant (e.g., computer-readable instructions) associated with a mobile device can download a profile from a service provider and install the profile on the mobile device. As a result, the SIM card of the mobile device can be associated with the downloaded profile provided by the service provider. General eSIM profile provisioning is defined in GSMA RSP standard SGP.22, for example.

In at least one example, a service provider can establish certain limitations for an account of a consumer, which can be indicated in the profile associated with the SIM card of the device of the consumer. The limitations can be temporal, geographical, etc. For instance, when a consumer (and mobile device) travels to a foreign country, the consumer may not be able use data services offered by the service provider (e.g., data usage when the consumer is in a foreign country is restricted for the account of the consumer). Or, when a consumer (and mobile device) travels to a foreign country, the consumer may be able to use data services offered by the service provider but can be charged a higher rate (e.g., data usage when the consumer is in a foreign country is associated with an increased rate for the account of the consumer), and accordingly, the consumer can choose not to use data services offered by the service provider. In some examples, when a consumer is travelling the consumer can use some services offered by the service provider while explicitly turning off other services offered by the service provider to avoid excessive charges. Limitations on such services are inconvenient for the consumer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In examples of the present disclosure, provisioning access to an alternative service provider to a user device via e-subscriber identity module (SIM) profile management is described. As described above, user devices, such as mobile devices, can be associated with SIM cards which store personal information of respective account holders. A SIM card can be a portable memory chip or an integrated memory chip. In some examples, for instance with eSIM, a profile (e.g., an eSIM profile) including a unique identifier (e.g., ICCID, etc.) and other data (e.g., account information, rate plan, restrictions, etc.) can be downloaded by a user device. For instance, a local profile assistant (e.g., computer-readable instructions) associated with a user device can download a profile from a service provider, such as a telecommunication service provider, and install the profile on the user device. As a result, the SIM card of the user device can be associated with the downloaded profile, which is associated with the service provider. General eSIM profile provisioning is defined in GSMA RSP standard SGP.22, as described above.

In at least one example, a service provider can establish certain restrictions or limitations for an account of a consumer, which can be indicated in the profile associated with the SIM card of the device of the consumer. The limitations can be temporal, geographical, etc. For instance, when a consumer (and user device) travels to a foreign country, the consumer may not be able use data services offered by the service provider (e.g., data usage when the consumer is in a foreign country is restricted for the account of the consumer). Or, when a consumer (and user device) travels to a foreign country, the consumer may be able to use data services offered by the service provider but can be charged a higher rate (e.g., data usage when the consumer is in a foreign country is associated with an increased rate for the account of the consumer), and accordingly, the consumer can choose not to use data services offered by the service provider. In some examples, when a consumer is travelling, a consumer can use some services offered by the service provider, for instance voice and messaging services, while explicitly turning off other services offered by the service provider, such as data transmission, to avoid excessive charges and/or some other inconvenience. Such selective usage can be inconvenient to consumers.

Techniques described herein are directed to enabling consumers that are outside of a home coverage area to use services with less inconvenience by enabling alternative service provider(s) to provision profile(s), such as eSIM profile(s), associated with the alternative service provider(s) to respective user devices. By provisioning eSIM profile(s) associated with alternative service provider(s) to respective user devices, the alternative service provider(s) can enable the consumer to use one or more services offered by the alternative service provider(s) while the consumer is outside of his or her home coverage area. As a result, the consumer can transmit data and/or use other services (e.g., voice and/or messaging services) offered by an alternative service provider, via the alternative service provider instead of the service provider with less inconvenience to the consumer.

Figure 1:
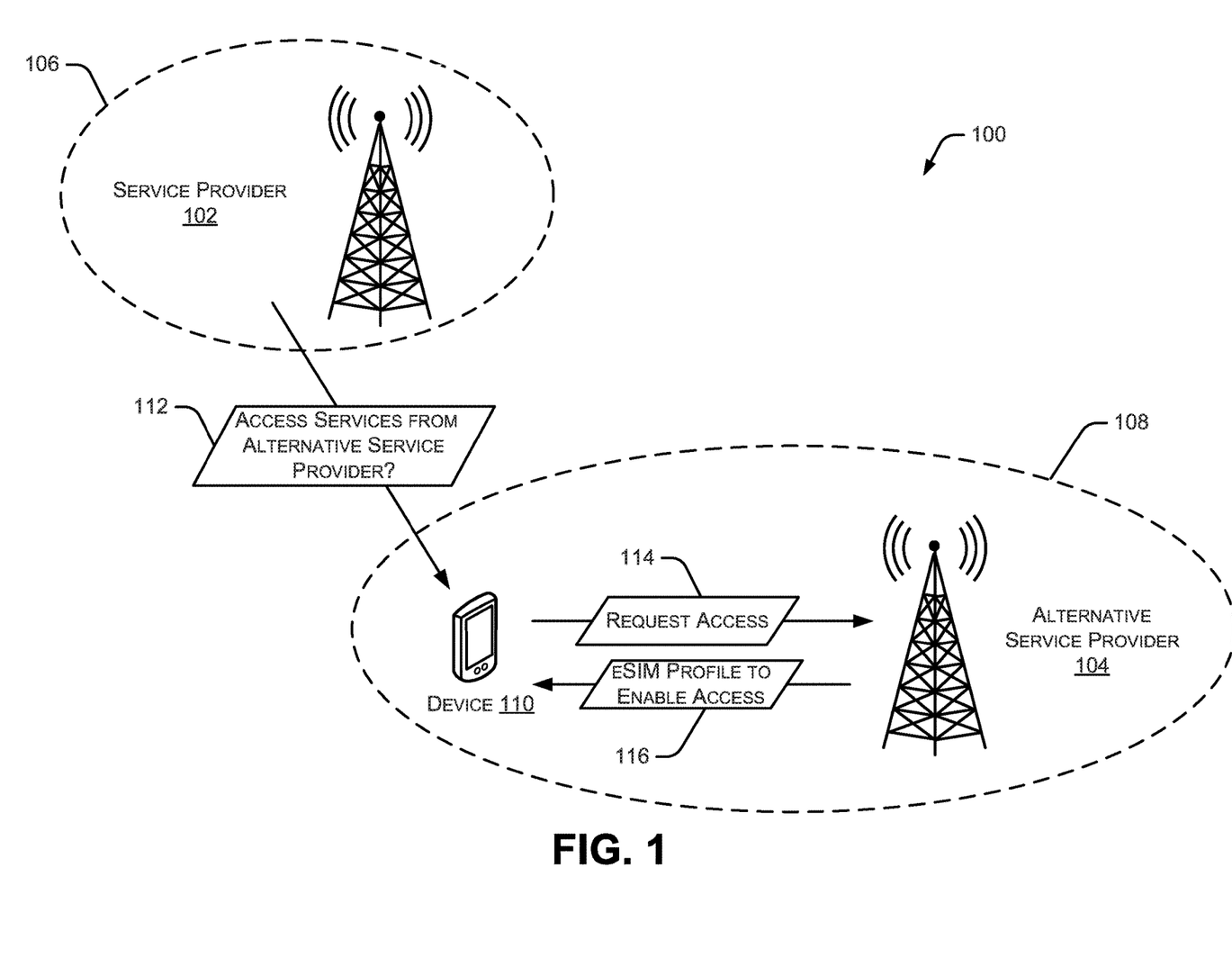
FIG. 1 illustrates an environment for provisioning access to an alternative service provider via eSIM profile management.

FIG. 1 illustrates an environment 100 for provisioning access to an alternative service provider via eSIM profile management. The environment 100 includes two service providers: a service provider 102 and an alternative service provider 104. While the environment 100 includes two service providers, any number of service providers can be included in such an environment. The service provider 102 and/or alternative service provider 104 can provide services, such as telecommunication services, to one or more devices that subscribe to such services (e.g., via establishment of an account with the respective service provider 102 or 104). In at least one example, the service provider 102 and the alternative service provider 104 each can be associated with one or more servers, as described below. Additionally, in at least one example, the service provider 102 and the alternative service provider 104 each can be associated with a home coverage area. For instance, the service provider 102 can be associated with a home coverage area 106 and the alternative service provider 104 can be associated with a home coverage area 108. For the purpose of this discussion, a home coverage area corresponds to a predefined area within which one or more devices are permitted to access services provided by a respective service provider at a particular rate. In some examples, a home coverage area can be defined by the terms of the agreement (e.g., service plan) used to establish a relationship (e.g., account) between a user and the service provider. In at least one example, one or more devices can access service(s) of a service provider outside of a home coverage area, but can incur an additional charge for doing so, or can experience some other inconvenience.

In at least one example, the service provider 102 can provide services to a device 110. That is, in at least one example, a user associated with the device 110 can enter into an agreement with the service provider 102 for the service provider 102 to provide services to the device 110. The agreement can define which services the device 110 is permitted to use, rate(s) associated with the services, data allocation(s) associated with the services, geographical restrictions on where the services can be accessed (e.g., the home coverage area), etc. In an example, the device 110 can include a SIM card, as described above. In at least one example, the SIM card can store a profile corresponding to the service provider 102. As described above, the profile can include a unique identifier associated with the service provider 102 and other data (e.g., account information, rate plan, restrictions, etc.).

Additionally, the service provider 102 can establish a relationship with one or more other service providers, such as the alternative service provider 104, such that the one or more other service providers can provide service(s) to users that subscribe to services provided by the service provider 102 on behalf of the service provider 102 when the users are outside of their home coverage area 106. For the purpose of this discussion, such service providers can be called "alternative service providers." In some examples, a relationship between the service provider 102 and an alternative service provider (e.g., the alternative service provider 104) can be memorialized in an agreement, which indicates various terms of the agreement, including a revenue-sharing arrangement between the service provider 102 and the alternative service provider.

The service provider 102 can receive a location update indicating a location of the device 110. In at least one example, the service provider 102 can determine that the device 110 is located outside of the home coverage area 106. Additionally, the service provider 102 can determine that, after the lapse of a predetermined period of time following receipt of the location update, the device 110 has not established a data connection. Accordingly, the service provider 102 can determine that a user operating the device 110 has turned off data capabilities and/or the device 110 is otherwise not transmitting (e.g., sending and/or receiving) data. Based on determining that the device 110 is not transmitting data, the service provider 102 can determine whether it has an established relationship with a service provider that provides services in the coverage area corresponding to the location of the device 110, i.e., the alternative service provider 104.

Based at least in part on determining that the service provider 102 has an established relationship with the alternative service provider 104, the service provider 102 can send a notification 112 to the device 110. The notification 112 can include an access mechanism for enabling access to one or more services offered by the alternative service provider 104. The access mechanism can include a hyperlink, quick response (QR) code, or some other type of mechanism, the actuation of which can, in some examples, initiate a request 114 for access to the one or more services offered by the alternative service provider 104. That is, responsive to determining actuation of the access mechanism associated with the notification 112, the device 110 can send a request 114 for access to the one or more services offered by the alternative service provider 104. Responsive to receiving the request 114, the second alternative service provider 104 can send an eSIM profile 116 to the device 110. The device 110 can download the eSIM profile 116 and can associate the eSIM profile 116 with the SIM card of the device 110. As a result, the device 110 can be provisioned with access to the one or more services offered by the alternative service provider 104. That is, the device 110 can send and/or receive calls, messages, and/or data via the alternative service provider 104 instead of the service provider 102, as if the device 110 was a subscriber to the alternative service provider 104. In at least one example, the alternative service provider 104 can send an indication to the service provider 102 indicating that the eSIM profile 116 associated with the alternative service provider 104 was downloaded by the device 110.

Figure 2:
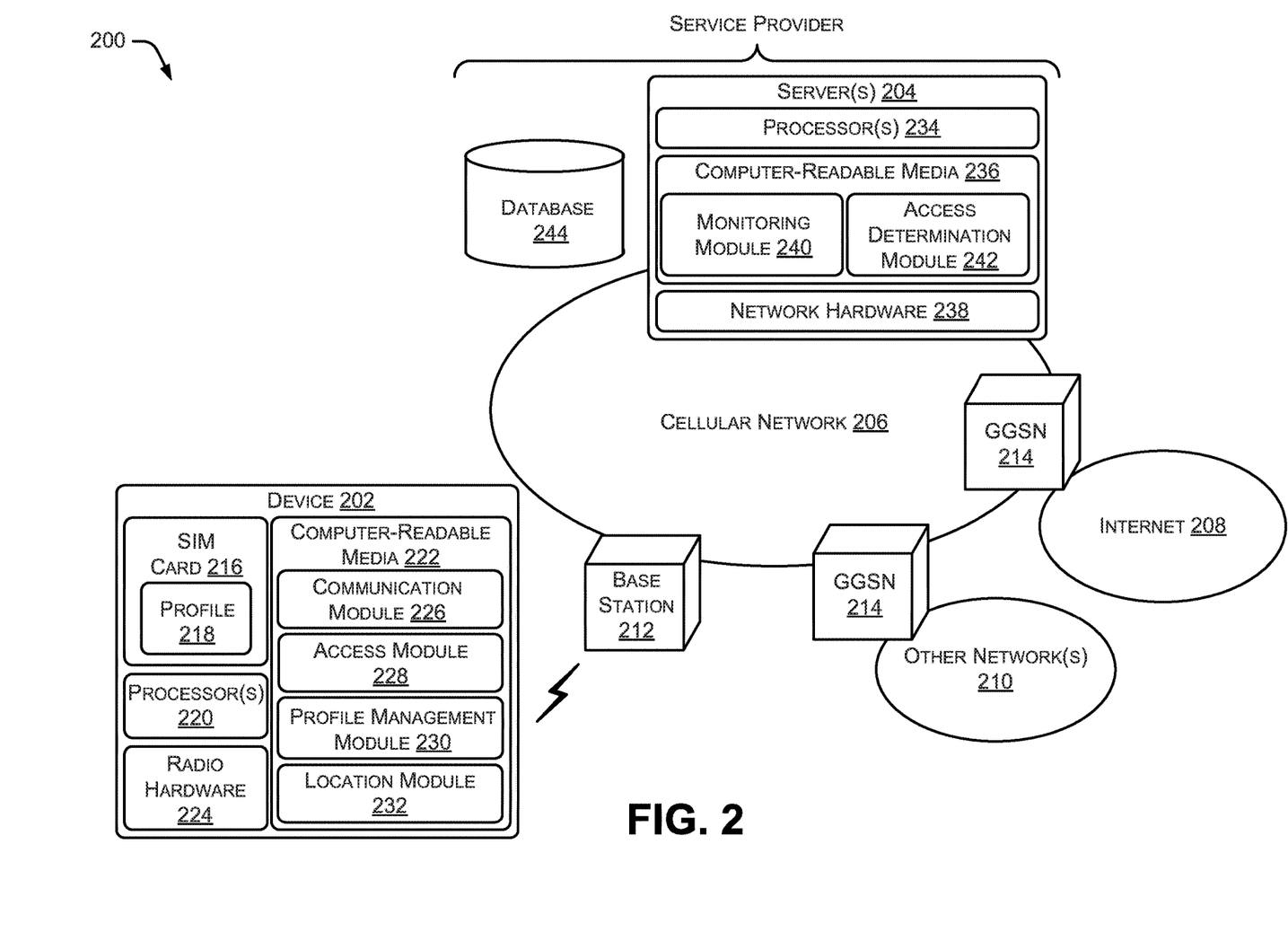
FIG. 2 illustrates an environment for provisioning access to an alternative service provider via eSIM profile management.

FIG. 2 illustrates an environment 200 for provisioning access to an alternative service provider via eSIM profile management. As illustrated, environment 200 includes a device 202 communicatively coupled to server(s) 204 via a cellular network 206, the Internet 208, and/or one or more other networks 210. In at least one example, the device 202 can correspond to the device 110 and the server(s) 204 can be associated with a service provider, such as service provider 102, described above with reference to FIG. 1. In some examples, device 202 can connect to the cellular network 206 via a corresponding base station 212. The cellular network 206 can be responsible for routing voice communication to other networks 210, as well as routing data communication to external packet switched networks, such as the Internet 208. For example, the cellular network 206 can include a Gateway GPRS Support Node (GGSN) 214 and/or another equivalent node (e.g., packet data network gateway (PGW), etc.).

Device 202 can correspond to user equipment (UE), which can be operated by an account holder. The account holder can be an entity (e.g., person, company, etc.) that subscribes to services, such as telecommunication services, via a service plan. The service plan can indicate an amount of data, voice calling, and/or text messaging available to the device 202, whether data, voice calling, and/or text messaging is available internationally (or outside of a home coverage area), data transmission speeds accessible to the device 202, etc. The service plan can be available to the account holder for a particular rate. In some examples, the service plan is active for a particular period of time (e.g., a two-year plan, a five-year plan, etc.).

Device 202 can correspond to UE including, but not limited to, a smart phone, a personal digital assistant, a netbook, a laptop computer, a smart appliance, and/or another electronic device that is capable of sending or receiving voice, video, and/or data via the cellular network 206, the Internet 208, and/or one or more other network(s) 210 (e.g., a Wi-Fi network, another access network, etc.). In at least one example, the device 202 can include a SIM card 216, which can store personal information of an account holder. The SIM card 216 can be a portable memory chip or an integrated memory chip. The SIM card 216 can include data associated with a phone number of an account holder associated with the device 202, an address book of the account holder, text messages sent and received via the device 202, and other data.

In at least one example, the SIM card 216 can include a profile 218. The profile 218 can include at least one identifier. The identifier can be associated with a particular service provider. That is, the identifier can indicate a service provider associated with the device 202. Additionally, the profile 218 can include data indicating which service plans, services, functionalities, etc. are available for the device 202. While a single profile 218 is shown in association with a SIM card 216, a SIM card 216 can include multiple profiles, which can be associated with multiple service providers, etc.

The device 202 can include processor(s) 220, computer-readable media 222, and radio hardware 224. The processor(s) 220 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 220 can execute one or more modules and/or processes to cause the device 202 to perform a variety of functionalities, as set forth above and explained in further detail in the following disclosure. Additionally, each of the processor(s) 220 can possess its own local memory, which also can store program modules, program data, and/or one or more operating systems.

Depending on the exact configuration and type of the device 202, the computer-readable media 222, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 222 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the device 202. Any such non-transitory computer-readable media can be part of the device 202.

In contrast, communication media includes computer readable instructions, data structures, program modules, or other data in a modulated data signal, such as a carrier wave, or other transmission mechanism. As defined herein, computer storage media does not include communication media.

The computer-readable media 222 can include one or more modules and data structures including, for example, a communication module 226, an access module 228, a profile management module 230, and a location module 232. The one or more modules and data structures can be in the form of stand-alone applications, productivity applications, an operating system component, or any other application or software module configured to facilitate the provisioning of access to service(s) offered by an alternative service provider, as described herein.

The communication module 226 can be configured to facilitate communications on behalf of the device 202. That is, the communication module 226 can send and/or receive calls, messages, and/or data on behalf of the device 202. In at least one example, the communication module 226 can receive a notification that includes an access mechanism from server(s) associated with a service provider. In at least one example, the notification can be a message, an email, an in-application notification, a push notification, etc. That is, the notification can be transmitted to the device 202 via messaging services associated with the cellular network 206, internet protocol (IP) communications via the Internet 208, etc. In an example, the access mechanism can be a hyperlink, a QR code, etc.

In at least one example, the communication module 226 can determine actuation of the access mechanism. In at least one example, based on the actuation of the access mechanism, the communication module 226 can download an application to enable the device 202 to access service(s) provided by the alternative service provider. In at least one example, the communication module 226 can download the application via an IP connection associated with one or more of the networks (e.g., the Internet 208, the other network(s) 210). In at least one example, the access module 228 can correspond to the application. That is, the access module 228 can be downloaded by the device 202 based on actuation of the access mechanism associated with the notification. In some examples, the access module 228 may have been previously downloaded or may otherwise stored on the device 202.

The access module 228 can be configured to enable access to services associated with an alternative service provider. In at least one example, the access module 228 can query the SIM card 216 to determine whether the SIM card 216 is associated with a profile corresponding to the alternative service provider. If the SIM card 216 is associated with a profile corresponding to the alternative service provider, the access module 228 can determine whether the profile is valid. In some examples, a profile can be associated with a limitation, such as a temporal limitation, a geographical limitation, etc., which can cause the profile to expire (and therefore become invalid). The access module 228 can determine whether the profile is valid (e.g., has not expired) and, if the profile is valid, the access module 228 can access the previously downloaded profile and service(s) available via the alternative service provider. If the SIM card 216 is not associated with a profile corresponding to the alternative service provider and/or the profile is not valid, the access module 228 can determine registration information associated with the device 202. For instance, the access module 228 can prompt the user to input information associated with the user, the account corresponding to the user, and/or the device 202. Based on receiving input from the user, the access module 228 can determine registration information and generate a request based on the registration information.

In at least one example, the access module 228 can send a request to server(s) associated with the alternative service provider. The request can include registration information and, in some examples, an indication of a profile type can be associated with the request. A profile type can correspond to a category of a profile (e.g., consumer profile, network profile, roaming profile, etc.). Based at least in part on sending the request to the server(s) associated with the alternative service provider, the profile management module 230 can receive one or more data items that collectively represent the profile from the server(s) associated with the alternative service provider, as described below.

The profile management module 230, which can perform the same or similar functions as the local profile assistant described above, can be configured to receive a profile from server(s) associated with an alternative service provider and associate the profile with the SIM card 216. That is, the profile management module 230 can receive one or more data items that collectively represent the profile (hereinafter "profile") from the server(s) associated with the alternative service provider and can associate the profile with the SIM card 216, such that the SIM card 216 is associated with the profile 218 and an additional profile (not pictured in FIG. 2). In at least one example, the server(s) associated with the alternative service provider can provide an access code to the profile management module 230 to establish a secure channel for transmitting the profile from the server(s) associated with the alternative service provider to the profile management module 230. Upon receiving the profile, the profile management module 230 can install the profile and, in some examples, send an installation result (e.g., success, failure, etc.) to the server(s) associated with the alternative service provider.

While the example provided above is directed to receiving a notification at the device 202 and responsive to sending a request to the server(s) associated with the alternative service provider, receiving a profile from the server(s) associated with the alternative service provider, in additional and/or alternative examples, the server(s) 204 can send a notification directly to the server(s) associated with the alternative service provider and the server(s) associated with the alternative service provider can provision the profile to the device 202, for instance, via an IP connection associated with one or more of the networks (e.g., the Internet 208, the other network(s) 210). In some examples, the profile management module 230 can prompt the user to install the application and/or accept the profile prior to installing the profile on the device 202. In other examples, for instance if a user has provided an express indication to install profile(s) that are received from particular service provider(s), the profile management module 230 can install the profile on the device 202 without input from the user. In such examples, a profile can be provided to the device 202 via a secure IP connection.

The location module 232 can be configured to send a location update to the server(s) 204. The location update can indicate a location of the device 202. Additionally and/or alternatively, a location update can identify a network over which the device 202 is communicating, a type of network (e.g., 2G, 3G, 4G, LTE, etc.) over which the device 202 is communicating, etc. In at least one example, the location module 232 can utilize localization techniques by multilateration of radio signals between various transceivers of the cellular network 206 and the device 202 to determine the location of the device 202. In additional and/or alternative examples, the location module 232 can leverage global positioning system sensor(s), wi-fi positioning system sensor(s), etc. to determine the location of the device 202. In at least one example, the location module 232 can send location update(s) at a particular frequency, after a lapse of a predetermined period of time, after an event (e.g., the device 202 is turned on, activation of voice and/or messaging services, etc.), etc.

The radio hardware 224 provides wireless UE capabilities, such as connecting to the base station 212, a Wi-Fi network, or other wireless networks. The radio hardware 224 can include or be incorporated into processors, ASICs, programmable circuits such as FPGAs, or in other ways.

As described above, in at least one example, device 202 can connect to the cellular network 206 via a base station 212. A base station 212 can correspond to a fixed-location transceiver, which can also be called a cell site. As described above, some devices may not be capable of connecting to the cellular network 206 via a base station (e.g., base station 212). In such examples, a such devices can register with the cellular network 206 through the Internet 208 using a unique identifier, such as an IMPI (IP multimedia private identity), an IMPU (IP multimedia public identity), a globally routable user agent URI (GRUU), or other. In at least one example, these identifiers can take the form of a telephone number.

A service provider can be associated with one or more servers 204. Each of the server(s) 204 can be any type of server, such as a network-accessible server. In various examples, each of the server(s) 204 can be associated with one or more processors 234, computer-readable media 236, and network hardware 238. The processor(s) 234 can have the same and/or similar structure and/or function as the processor(s) 220, described above.

Depending on the exact configuration and type of the server(s) 204, the computer-readable media 236 can include computer storage media and/or communication media. The computer-readable media 236 can have the same and/or similar structure and/or function as the computer-readable media 222, described above. The computer-readable media 236 can include one or more modules and data structures including, for example, a monitoring module 240 and an access determination module 242. The one or more modules and data structures can be in the form of stand-alone applications, productivity applications, an operating system component, or any other application or software module having data items that facilitate provisioning access to service(s) offered by an alternative service provider, as described herein.

The monitoring module 240 can be configured to monitor one or more devices, such as device 202. In at least one example, the monitoring module 240 can receive location update(s) from the device 202. As described above, a location update can indicate a location of the device 202. Additionally and/or alternatively, a location update can identify a network over which the device 202 is communicating, a type of network (e.g., 2G, 3G, 4G, LTE, etc.) over which the device 202 is communicating, etc. In such an example, the monitoring module 240 can determine the location of the device 202 based on a location update. In an alternative example, the monitoring module 240 can receive location data associated with the device 202 and can determine the location of the device 202 based on the location data. Moreover, in some examples, the monitoring module 240 can determine the location of the device 202 based on other signals, such as an IP address associated with a wi-fi connection between the device 202 and a wireless network, an express indication provided via the device 202, etc. In at least one example, the monitoring module 240 can leverage the location of the device 202 to determine whether the location of the device 202 is within a home coverage area.

Based on determining that the location of the device 202 is not within the home coverage area, the monitoring module 240 can determine whether the device 202 has established a data connection for transmitting (e.g., sending or receiving) data. In at least one example, the monitoring module 240 can start a timer responsive to receiving a location update (or another signal) and, after the lapse of a predetermined period of time, the monitoring module 240 can determine whether a data connection has been established with the service provider. In some examples, the monitoring module 240 can perform multiple queries within the predetermined period of time (e.g., at a particular frequency, etc.) to determine whether a data connection has been established with the service provider. If a data connection has not been established after the lapse of a predetermined period of time, the monitoring module 240 can determine that the device 202 is not transmitting data in the location. That is, if the monitoring module 240 determines that a time period between when the monitoring module 240 receives a location update (or other signal) and when the monitoring module 240 queries to determine whether a data connection has been established exceeds a threshold, the monitoring module can determine that the device 202 is not transmitting data in the location.

In at least one example, a database 244 can store data indicating relationship(s) between the service provider and one or more alternative service providers. In at least one example, each alternative service provider can be mapped to, or otherwise associated with, a location. In at least one example, the database 244 can be integral to the server(s) 204. In other examples, the database 244 can be communicatively coupled to the server(s) 204, as illustrated in FIG. 2.

The access determination module 242 can be configured to access the database 244 to determine whether an alternative service provider is available for provisioning services to the device 202 based on determining that the device 202 is outside of the home coverage area and is not transmitting data in the location. That is, based on determining that the device 202 is not transmitting data in the location, the monitoring module 240 can access the database 244 to determine whether any alternative service providers with whom the service provider has a pre-existing relationship provide service(s) in the location. In at least one example, the access determination module 242 can perform a look-up, or another query, to determine whether the location is associated with one or more alternative service providers. Based on determining that the location is associated with an alternative service provider, the access determination module 242 can determine service provider information associated with the alternative service provider. In some examples, the service provider information can be mapped to, or otherwise associated with, an indication of an alternative service provider in the database 244. The service provider information can include a country code associated with the alternative service provider, a network code associated with the alternative service provider, a name of the alternative service provider, service(s) available from the alternative service provider, etc. The access determination module 242 can generate a notification based on the service provider information and can send the notification to the device 202. As described above, the notification can be a message, an email, an in-application notification, a push notification, etc. The notification can communicate to a user of the device 202 that an alternative service provider is available to provide service(s) to the device 202 while the device 202 is in the location. In at least one example, the notification can include an access mechanism, which can include a hyperlink, a QR code, etc., which can enable the device 202 to access the service(s) associated with the alternative service provider.

In some examples, the location can be associated with more than one alternative service provider in the database 244. In such examples, the access determination module 242 can determine the alternative service provider based on one or more policies. For instance, the one or more policies can indicate that the alternative service provider associated with the lowest rate is to be selected, or the alternative service provider associated with the highest level of technology (e.g., LTE, 4G, 3G, etc.) is to be selected. In some examples, the access determination module 242 can select multiple alternative service providers and can generate a notification that includes the multiple alternative service providers. A user can select which of the alternative service providers from which he or she desires to access service(s).

As described above, in an alternative example, the access determination module 242 can send a request to the alternative service provider to provision a profile to the device 202. In such an example, the request can include information about the device 202 and/or an account associated with the device and, in some examples, an indication of a profile type can be associated with the request.

The network hardware 238 can provide wired or wireless networking capabilities to the server(s) 204. The network hardware 238 can include or be incorporated into processors, ASICs, programmable circuits such as FPGAs, or in other ways.

Figure 3:
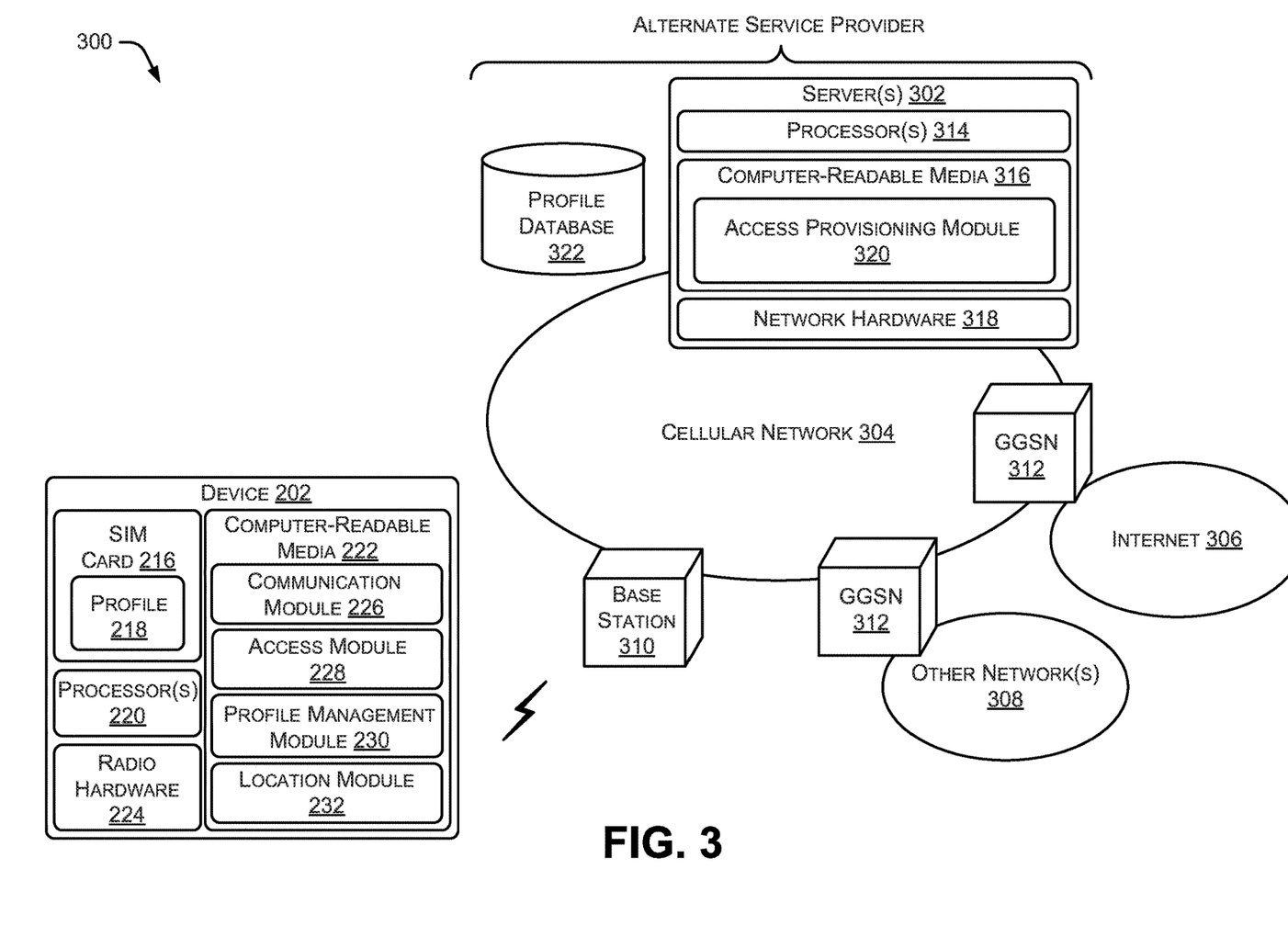
FIG. 3 illustrates an environment for provisioning access to an alternative service provider via eSIM profile management.

FIG. 3 illustrates an environment 300 for provisioning access to an alternative service provider via eSIM profile management. As illustrated, environment 300 includes the device 202, described above with reference to FIG. 2, communicatively coupled to server(s) 302 via a cellular network 304, the Internet 306, and/or one or more other networks 308. In at least one example, the device 202 can correspond to the device 110 and the server(s) 304 can be associated with a service provider, such as alternative service provider 104, described above with reference to FIG. 1. In some examples, device 202 can connect to the cellular network 304 via a corresponding base station 310. Base station 310 can have the same and/or similar structure and/or functionality as base station 212, described above with reference to FIG. 2. The cellular network 304 can be responsible for routing voice communication to other networks 308, as well as routing data communication to external packet switched networks, such as the Internet 306. For example, the cellular network 304 can include a Gateway GPRS Support Node (GGSN) 312 and/or another equivalent node (e.g., PGW, etc.).

As described above, the device 202 can move to a location outside of a home coverage area associated with a service provider. In some examples, an alternative service provider can provision access to one or more services by providing a profile to the device 202. The server(s) 302 can be associated with the alternative service provider. Each of the server(s) 302 can be any type of server, such as a network-accessible server. In various examples, each of the server(s) 302 can be associated with one or more processors 314, computer-readable media 316, and network hardware 318. The processor(s) 314 can have the same and/or similar structure and/or function as the processor(s) 220, described above.

Depending on the exact configuration and type of the server(s) 302, the computer-readable media 316 can include computer storage media and/or communication media. The computer-readable media 316 can have the same and/or similar structure and/or function as the computer-readable media 316, described above. The computer-readable media 316 can include one or more modules and data structures including, for example, an access provisioning module 320. The one or more modules and data structures can be in the form of stand-alone applications, productivity applications, an operating system component, or any other application or software module having data items for provisioning access to service(s) offered by an alternative service provider, as described herein.

The access provisioning module 320 can be configured to provision access to service(s) offered by the alternative service provider. In an example, the access provisioning module 320 can receive, from the device 202, a request for accessing service(s) available via the alternative service provider. As described above, in an alternative example, the access provisioning module 320 can receive a request for provisioning service(s) to the device 202 from server(s) associated with the service provider (e.g., as described above with reference to FIG. 2). In at least one example, the request can be associated with a profile type, as described above. In such an example, the access provisioning module 320 can extract the profile type and utilize the profile type to determine a profile to provision to the device 202.

The profile database 322 can store profile(s) associated with the alternative service provider. In at least one example, one or more profiles can be mapped to, or otherwise associated with, a profile type. In at least one example, the profile database 322 can be integral to the server(s) 302. In other examples, the profile database 322 can be communicatively coupled to the server(s) 302, as illustrated in FIG. 3.

In at least one example, the access provisioning module 320 can perform a look-up, or some other query, of a profile database 322 to determine whether a profile is mapped to, or otherwise associated with, the profile type. Based at least in part on determining that a profile is mapped to, or otherwise associated with, the profile type, the access provisioning module 320 can send the profile to the device 202. That is, in such an example, the access provisioning module 320 can send one or more data items that collectively represent the profile to the device 202. In at least one example, the access provisioning module 320 can provide an access code to the device 202 to establish a secure channel for transmitting the profile (e.g., the one or more data items that collectively represent the profile) from the access provisioning module 320 to the device 202. Additionally, in at least one example, if the access provisioning module 320 sends the profile without receiving a request from the device 202, the access provision module 320 can send a request for the device 202 to download an application for provisioning the profile and/or for a confirmation to download the profile prior to sending the profile to the device 202.

In some examples, the access provisioning module 320 can receive an indication whether the profile was successfully (or unsuccessfully) downloaded by the device 202. Depending on the indication, the access provisioning module 320 can send an indication to the service provider indicating that the device 202 successfully (or unsuccessfully) downloaded the profile.

The network hardware 318 can provide wired or wireless networking capabilities to the server(s) 302. The network hardware 318 can include or be incorporated into processors, ASICs, programmable circuits such as FPGAs, or in other ways.

Figure 4:
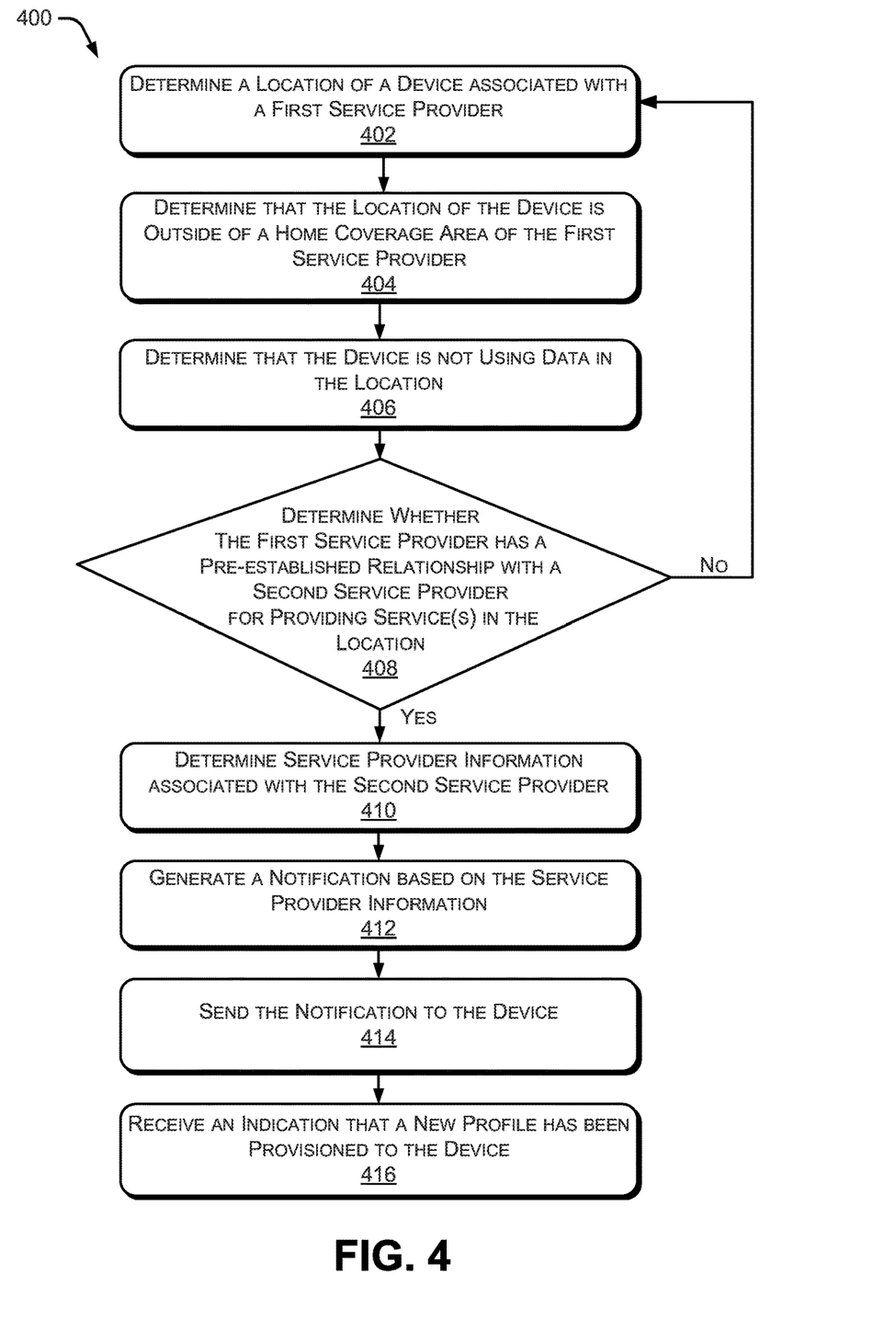
FIG. 4 illustrates an example process, performed by a service provider, for provisioning access to an alternative service provider via eSIM profile management.
Figure 5:
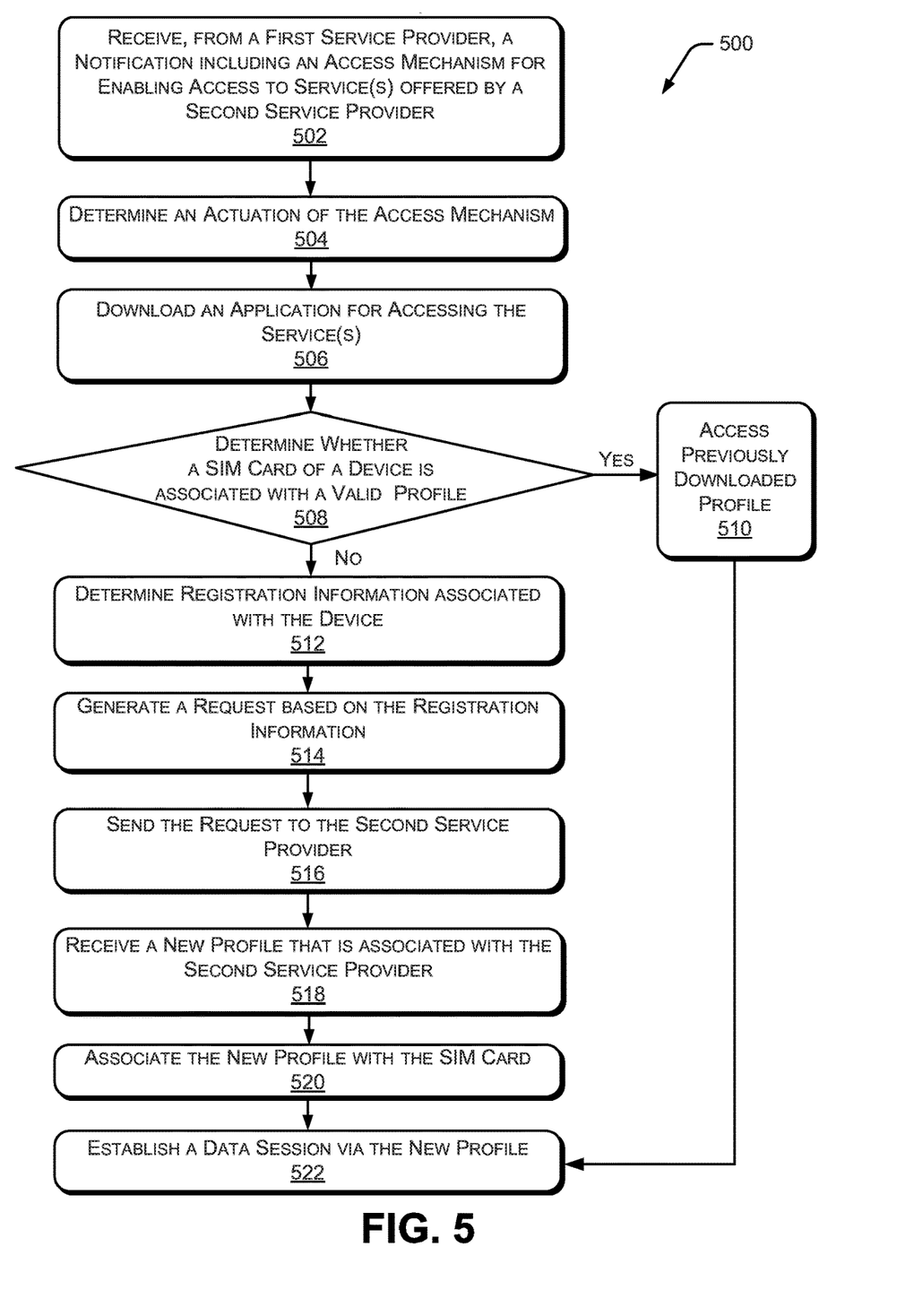
FIG. 5 illustrates an example process, performed by a user device, for receiving access to an alternative service provider via eSIM profile management.
Figure 6:
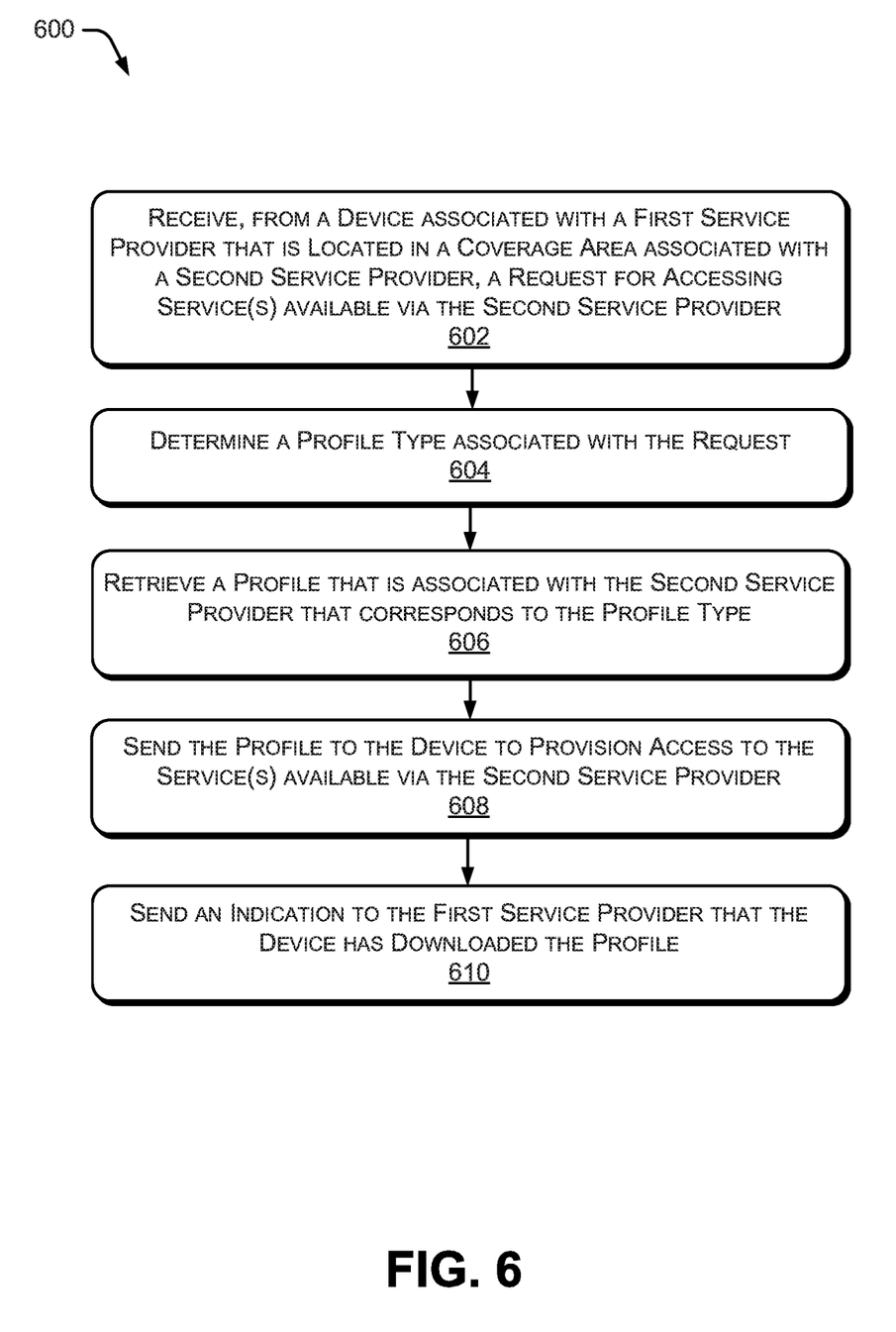
FIG. 6 illustrates an example process, performed by a service provider, for provisioning access associated with the service provider via eSIM profile management.

FIGS. 4-6 describe example processes for facilitating network-based device management. The example processes are described in the context of the environments of FIGS. 1-3, but are not limited to those environments.

The processes described above in association with FIGS. 4-6 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, ASICs, programmable circuits such as FPGAs, or in other ways. The order in which the operations are described is not intended to be construed as a limitation, and any number of the described operations can be combined in any order and/or in parallel to implement the processes.

FIG. 4 illustrates an example process 400, performed by a first provider (e.g., service provider 102), for provisioning access to a second service provider (e.g., alternative service provider 104) via eSIM profile management.

Block 402 illustrates determining a location of a device associated with a first service provider. As described above, the monitoring module 240 can be configured to monitor one or more devices, such as device 202. In at least one example, the monitoring module 240 can receive location update(s) from the device 202. As described above, a location update can indicate a location of the device 202. Additionally and/or alternatively, a location update can identify a network over which the device 202 is communicating, a type of network (e.g., 2G, 3G, 4G, LTE, etc.) over which the device 202 is communicating, etc. In such an example, the monitoring module 240 can determine the location of the device 202 based on a location update. In at least one example, the location module 232 can receive location update(s) at a particular frequency, after a lapse of a predetermined period of time, after an event (e.g., the device 202 is turned on, activation of voice and/or messaging services, etc.), etc.

In an alternative example, the monitoring module 240 can receive location data associated with the device 202 and can determine the location of the device 202 based on the location data. Moreover, in some examples, the monitoring module 240 can determine the location of the device 202 based on other signals, such as an IP address associated with a wi-fi connection between the device 202 and a wireless network, an express indication provided via the device 202, etc.

Block 404 illustrates determining that the location of the device is outside of a home coverage area of the first service provider. In at least one example, the monitoring module 240 can leverage the location of the device 202 to determine whether the location of the device 202 is within a home coverage area. That is, the monitoring module 240 can compare the location of the device 202 with the geographical boundary of the home coverage area and can determine that the location of the device 202 is outside of the home coverage area.

Block 406 illustrates determining that the device is not using data in the location. Based on determining that the location of the device 202 is not within the home coverage area, the monitoring module 240 can determine whether the device 202 has established a data connection for transmitting (e.g., sending or receiving) data. In at least one example, the monitoring module 240 can start a timer responsive to receiving a location update (or another signal) and, after the lapse of a predetermined period of time, the monitoring module 240 can determine whether a data connection has been established with the first service provider. In some examples, the monitoring module 240 can perform multiple queries within the predetermined period of time (e.g., at a particular frequency, etc.) to determine whether a data connection has been established with the first service provider. If a data connection has not been established after the lapse of a predetermined period of time, the monitoring module 240 can determine that the device 202 is not transmitting data in the location. That is, if the monitoring module 240 determines that a time period between when the monitoring module 240 receives a location update (or other signal) and when the monitoring module 240 queries to determine whether a data connection has been established exceeds a threshold, the monitoring module can determine that the device 202 is not transmitting data in the location. In at least one example, the device 202 may not be transmitting data responsive to the user explicitly turning off data transmission capabilities associated with the device 202.

Block 408 illustrates determining whether the first service provider has a pre-established relationship with a second service provider for providing service(s) in the location. The access determination module 242 can be configured to access the database 244 to determine whether a second service provider is available for provisioning services to the device 202 based on determining that the device 202 is outside of the home coverage area and is not transmitting data in the location. That is, based on determining that the device 202 is outside of the home coverage area and is not transmitting data in the location, the monitoring module 240 can access the database 244 to determine whether any second service providers with whom the first service provider has a pre-existing relationship provide service(s) in the location. In at least one example, the access determination module 242 can perform a look-up, or another query, to determine whether the location is associated with one or more second service providers.

Based at least in part on determining that the first service provider does not have a relationship with any second service providers that provide service(s) in the location, the access determination module 242 can refrain from taking an additional action. Process 400 can return to block 402, wherein new location update(s) and/or location data can be received and can be used to determine the location of the device 202. Based at least in part on determining that the first service provider has a relationship with at least one second service provider that provides service(s) in the location, the access determination module 242 can determine service provider information associated with the second service provider, as illustrated in block 410.

As described above, based on determining that the location is associated with a second service provider, the access determination module 242 can determine service provider information associated with the second service provider. In some examples, the service provider information can be mapped to, or otherwise associated with, an indication of a second service provider in the database 244. The service provider information can include a country code associated with the second service provider, a network code associated with the second service provider, a name of the second service provider, service(s) available from the second service provider, etc.

Block 412 illustrates generating a notification based on the service provider information. The access determination module 242 can generate a notification based on the service provider information and can send the notification to the device 202, as illustrated in block 414. As described above, the notification can be a message, an email, an in-application notification, a push notification, etc. The notification can communicate to a user of the device 202 that a second service provider is available to provide service(s) to the device 202 while the device 202 is in the location. In at least one example, the notification can include an access mechanism, which can include a hyperlink, a QR code, etc., which can enable the device 202 to access the service(s) associated with the alternative service provider, as described above.

Block 416 illustrates receiving an indication that a new profile has been provisioned to the device. In some examples, responsive to sending the notification to the device 202, the monitoring module 240 can receive an indication from server(s) associated with the second service provider (e.g., server(s) 304 described above with reference to FIG. 3). The indication can indicate whether an alternative profile was provisioned to the device 202 and/or whether the alternative profile was successfully downloaded by the device 202.

FIG. 5 illustrates an example process 500, performed by a user device (e.g., device 202) associated with a first service provider (e.g., service provider 102), for receiving access to a service provider (e.g., alternative service provider 104) via eSIM profile management.

Block 502 illustrates receiving, from a first service provider, a notification including an access mechanism for enabling access to service(s) offered by a second service provider. As described above, in at least one example, the communication module 226 can receive a notification that includes an access mechanism from server(s) associated with a first service provider. In at least one example, the notification can be a message, an email, an in-application notification, a push notification, etc. That is, the notification can be transmitted to the device 202 via messaging services associated with the cellular network 206, internet protocol (IP) communications via the Internet 208, etc. In an example, the access mechanism can be a hyperlink, a QR code, etc., as described above.

Block 504 illustrates determining actuation of the access mechanism. In at least one example, the communication module 226 can determine actuation of the access mechanism. For instance, the communication module 226 can determine that a user actuated a hyperlink.

Block 506 illustrates downloading an application for accessing the service(s). In at least one example, based on the actuation of the access mechanism, the communication module 226 can download an application to enable the device 202 to access service(s) provided by the second service provider. In at least one example, the communication module 226 can download the application via an IP connection associated with one or more of the networks (e.g., the Internet 208, the other network(s) 210). In at least one example, the access module 228 can correspond to the application. That is, the access module 228 can be downloaded by the device 202 based on actuation of the access mechanism associated with the notification. In some examples, the access module 228 may have been previously downloaded or may otherwise be stored on the device 202.

Block 508 illustrates determining whether a SIM card of a device is associated with a valid profile. In at least one example, the access module 228 can query the SIM card 216 to determine whether the SIM card 216 is associated with a profile corresponding to the second service provider. If the SIM card 216 is associated with a profile corresponding to the second service provider, the access module 228 can determine whether the profile is valid. In some examples, a profile can be associated with a limitation, such as a temporal limitation, a geographical limitation, etc., which can cause the profile to expire (and therefore become invalid). The access module 228 can retrieve the profile and can determine whether a current time is within a temporal limitation associated with the profile. If the current time is after the time corresponding to the temporal limitation associated with the profile, the access module 228 can determine that the profile is expired and is therefore invalid. Or, the access module 228 can retrieve the profile and can determine whether a current location of the device is within a geographical boundary associated with a geographical limitation of the profile. If the current location is outside of the geographical boundary, the access module 228 can determine that the profile is expired and is therefore invalid. Additional and/or alternative limitations can imagined.

Based at least in part on determining that the SIM card is associated with a valid profile, the access module 228 can access the previously downloaded profile, as illustrated in block 510. Based at least in part on determining that the SIM card is not associated with a valid profile, the access module 228 can determine registration information associated with the device, as illustrated in block 512. For instance, the access module 228 can prompt the user to input information associated with the user, the account corresponding to the user, and/or the device 202. Based on receiving input from the user, the access module 228 can determine registration information and generate a request based on the registration information.

Block 514 illustrates generating a request based on the registration information. In at least one example, the access module 228 can generate a request based on registration information. The request can include registration information and, in some examples, an indication of a profile type can be associated with the request. A profile type can correspond to a category of a profile (e.g., consumer profile, network profile, roaming profile, etc.).

Block 516 illustrates sending the request to the second service provider. In at least on example, the access module 228 can send the request to server(s) associated with the second service provider.

Block 518 illustrates receiving a new profile that is associated with the second service provider. Based at least in part on sending the request to the server(s) associated with the second service provider, the profile management module 230 can receive one or more data items that collectively represent the profile from the server(s) associated with the second service provider, as described below.

Block 520 illustrates associating the new profile with the SIM card. The profile management module 230 can be configured to receive a profile from server(s) associated with a second service provider and associate the profile with the SIM card 216. That is, the profile management module 230 can receive one or more data items that collectively represent the profile (hereinafter "profile") from the server(s) associated with the second service provider and can associate the profile with the SIM card 216, such that the SIM card 216 is associated with the profile 218 and an additional profile (not pictured in FIG. 2). In at least one example, the server(s) associated with the second service provider can provide an access code to the profile management module 230 to establish a secure channel for transmitting the profile from the server(s) associated with the second service provider to the profile management module 230. Upon receiving the profile, the profile management module 230 can install the profile and, in some examples, send an installation result (e.g., success, failure, etc.) to the server(s) associated with the second service provider.

Block 522 illustrates establishing a data session via the new profile. Based at least in part on receiving (and downloading) the new profile or accessing the previously downloaded profile (e.g., in block 510), the communication module 226 can facilitate communications on behalf of the device 202 using the profile associated with the second service provider. That is, the communication module 226 can send and/or receive calls, messages, and/or data on behalf of the device 202 via the second service provider instead of the first service provider.

FIG. 6 illustrates an example process 600, performed by a service provider (e.g., alternative service provider 104), for provisioning access associated with the service provider via eSIM profile management.

Block 602 illustrates receiving, from a device associated with a first service provider that is located in a coverage area associated with a second service provider, a request for accessing service(s) available via the second service provider. In an example, the access provisioning module 320 can receive, from the device 202, a request for accessing service(s) available via the second service provider.

Block 604 illustrates determining a profile type associated with the request. In at least one example, the request can be associated with a profile type, as described above. In such an example, the access provisioning module 320 can extract the profile type and utilize the profile type to determine a profile to provision to the device 202.

Block 606 illustrates retrieving a profile that is associated with the second service provider that corresponds to the profile type. In at least one example, the access provisioning module 320 can perform a look-up, or some other query, of a profile database 322 to determine whether a profile is mapped to, or otherwise associated with, the profile type.

Block 608 illustrates sending the profile to the device to provision to the service(s) available via the second service provider. Based at least in part on determining that a profile is mapped to, or otherwise associated with, the profile type, the access provisioning module 320 can send the profile to the device 202. That is, in such an example, the access provisioning module 320 can send one or more data items that collectively represent the profile to the device 202. In at least one example, the access provisioning module 320 can provide an access code to the device 202 to establish a secure channel for transmitting the profile (e.g., the one or more data items that collectively represent the profile) from the access provisioning module 320 to the device 202. Additionally, in at least one example, if the access provisioning module 320 sends the profile without receiving a request from the device 202, the access provision module 320 can send a request for the device 202 to download an application for provisioning the profile and/or for a confirmation to download the profile prior to sending the profile to the device 202

Block 610 illustrates sending an indication to the first service provider that the device has downloaded the profile. In some examples, the access provisioning module 320 can receive an indication whether the profile was successfully (or unsuccessfully) downloaded by the device 202. Depending on the indication, the access provisioning module 320 can send an indication to the first service provider indicating that the device 202 successfully (or unsuccessfully) downloaded the profile.

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

What is claimed is:

1. A system comprising:
one or more first servers associated with a first service provider, the one or more first servers including:
one or more processors;
one or more computer-readable media comprising:
a monitoring module executable by the one or more processors, the monitoring module including one or more instructions to perform first operations comprising determining that a device associated with the first service provider via a user profile in an active Subscriber Identity module (SIM) card is roaming at a location that is outside of a home coverage area of the first service provider with a connection to the first service provider comprising cellular voice or messaging access but without cellular data access, the determining comprising:
receiving, from the device, a location update at a first time indicating the location that is outside of the home coverage area,
monitoring the connection for establishment of the cellular data access, and
over a threshold period of time, failing to identify the establishment of the cellular data access with the first service provider;
an access determination module executable by the one or more processors, the access determination module including one or more instructions to perform second operations comprising querying a database of alternative service providers for a second service provider associated with the location outside of the home coverage area and sending, from the first service provider to the device, a notification including an access mechanism for initiating a request enabling access to one or more services offered by the second service provider based at least in part on the device being at the location that is outside of the home coverage area; and
an application executable by the device, the application including one or more instructions to perform third operations comprising:
receiving the notification from the one or more first servers;
determining actuation of the access mechanism;
sending, to one or more second servers associated with the second service provider, a request for access to the one or more services offered by the second service provider;
receiving an E-Subscriber Identity module (eSIM) profile from the one or more second servers; and
associating the eSIM profile with the SIM card of the device to enable the device to access the one or more services offered by the second service provider.

2. The system as claim 1 recites, wherein:
the database indicates pre-established relationships between the first service provider and the alternative service providers, the alternative service providers providing one or more services outside of the home coverage area of the first service provider; and
the second service provider provides the one or more services in the location of the device.

3. The system as claim 2 recites, the second operations further comprising:
determining service provider information associated with the second service provider; and
generating the notification based at least in part on the service provider information.

4. The system as claim 1 recites, the third operations further comprising:

determining that a profile associated with the second service provider is not stored on the SIM card;

determining registration information associated with the device; and generating the request based at least in part on the registration information.

5. The system as claim 1 recites, the third operations further comprising establishing a new data session with the second service provider via the eSIM profile instead of with the first service provider via a previously stored eSIM profile associated with the first service provider.

6. The system as claim 1 recites, wherein the eSIM profile is associated with a temporal limitation indicating a time after which the eSIM profile expires.

7. The system as claim 1 recites, wherein the access mechanism comprises a hyperlink configured to enable access to the one or more services offered by the second service provider.

8. The system as claim 1 recites, wherein the access mechanism comprises a QR code configured to enable access to the one or more services offered by the second service provider.

9. A computer-implemented method performed by one or more servers associated with a first service provider, comprising:

receiving, from a device having a first profile corresponding to the first service provider stored on an active Subscriber Identity Module (SIM) card associated with the device, a location update indicating that the device is roaming at a location that is outside of a home coverage area of the first service provider with a connection to the first service provider comprising cellular voice or messaging access;

monitoring the connection for establishment of cellular data access with the first service provider;

over a threshold period of time, failing to identify the establishment of the cellular data access with the first service provider from the monitoring;

determining, based at least in part on the device being at the location that is outside of the home coverage area and the failing to identify the establishment of the cellular data access, that the connection to the first service provider comprises the cellular voice or messaging access but without cellular data access;

querying a database indicating one or more pre-established relationships between the first service provider and one or more second service providers, the one or more second service providers providing one or more services outside of the home coverage area of the first service provider;

determining that a second service provider of the one or more second service providers provides the one or more services in the location of the device; and sending, to the device, a notification including an access mechanism for initiating a request enabling access to the one or more services offered by the second service provider via provisioning of a second profile associated with the second service provider.

10. The computer-implemented method as claim 9 recites, further comprising:

determining service provider information associated with the second service provider; and generating the notification based at least in part on the service provider information.

11. The computer-implemented method as claim 10 recites, wherein the service provider information includes at least one of a country code, a network code, or a name of the second service provider.

12. The computer-implemented method as claim 9 recites, wherein the notification comprises at least one of a text message, an email, a push notification, or an in-application notification.

13. The computer-implemented method as claim 9 recites, further comprising receiving an indication that the second profile has been provisioned to the device.

14. The computer-implemented method as claim 9 recites, wherein the access mechanism comprises a hyperlink configured to enable access to the one or more services offered by the second service provider.

15. The computer-implemented method as claim 9 recites, wherein the access mechanism comprises a QR code configured to enable access to the one or more services offered by the second service provider.

16. One or more non-transitory computer-readable storage media having instructions stored thereupon which are executable by one or more processors associated with a first service provider and which, when executed, cause the one or more processors to perform operations comprising:

receiving, from a device having a first profile corresponding to the first service provider stored on an active Subscriber Identity Module (SIM) card associated with the device, a location update indicating that the device is roaming at a location that is outside of a home coverage area of the first service provider with a connection to the first service provider comprising cellular voice or messaging access;

monitoring the connection for establishment of cellular data access with the first service provider;

over a threshold period of time, failing to identify the establishment of the cellular data access with the first service provider from the monitoring;

determining, based at least in part on the device being at the location that is outside of the home coverage area and the failing to identify the establishment of the cellular data access, that the connection to the first service provider comprises the cellular voice or messaging access but without cellular data access;

querying a database indicating one or more pre-established relationships between the first service provider and one or more second service providers, the one or more second service providers providing one or more services outside of the home coverage area of the first service provider;

determining that a second service provider of the one or more second service providers provides the one or more services in the location of the device; and sending, to the device, a notification including an access mechanism for initiating a request enabling access to the one or more services offered by the second service provider via provisioning of a second profile associated with the second service provider.

17. The one or more non-transitory computer-readable storage media according to claim 16, the operations further comprising:

determining service provider information associated with the second service provider; and generating the notification based at least in part on the service provider information.

18. The one or more non-transitory computer-readable storage media as claim 17 recites, wherein the service provider information includes at least one of a country code, a network code, or a name of the second service provider.

19. The one or more non-transitory computer-readable storage media as claim 16, wherein the notification comprises at least one of a text message, an email, a push notification, or an in-application notification.

20. The one or more non-transitory computer-readable storage media according to claim 16, the operations further comprising receiving an indication that the second profile has been provisioned to the device.

* * * * *